(12) United States Patent
Stubbe et al.

(10) Patent No.: US 10,029,584 B2
(45) Date of Patent: Jul. 24, 2018

(54) VEHICLE SEAT SLIDE RAIL REINFORCEMENT

(71) Applicant: ALLSAFE JUNGFALK GMBH & CO. KG, Engen (DE)

(72) Inventors: Ingolf Stubbe, Gottmadingen (DE); Andreas Limon, Singen (DE)

(73) Assignee: ALLSAFE JUNGFALK GMBH & CO. KG, Engen (DE)

( * ) Notice: Subject to any disclaimer, the term of this patent is extended or adjusted under 35 U.S.C. 154(b) by 0 days.

(21) Appl. No.: 14/902,755

(22) PCT Filed: Jul. 7, 2014

(86) PCT No.: PCT/EP2014/001868
§ 371 (c)(1),
(2) Date: Jan. 4, 2016

(87) PCT Pub. No.: WO2015/000601
PCT Pub. Date: Jan. 8, 2015

(65) Prior Publication Data
US 2016/0167547 A1 Jun. 16, 2016

(30) Foreign Application Priority Data

Jul. 5, 2013 (DE) ........................ 10 2013 107 083

(51) Int. Cl.
*B60N 2/015* (2006.01)
*B60N 2/07* (2006.01)

(52) U.S. Cl.
CPC ......... *B60N 2/01583* (2013.01); *B60N 2/073* (2013.01)

(58) Field of Classification Search
CPC ................ B60N 2/015; B60N 2/01508; B60N 2/01516; B60N 2/01525; B60N 2/0155; B60N 2/01583; B60N 2/073
See application file for complete search history.

(56) References Cited

U.S. PATENT DOCUMENTS

| 5,120,017 A | 6/1992 | Feener, III | |
| 5,921,606 A * | 7/1999 | Moradell | B60N 2/01541 248/429 |
| 5,961,088 A * | 10/1999 | Chabanne | B60N 2/01525 248/429 |
| 6,155,626 A * | 12/2000 | Chabanne | B60N 2/0155 248/503.1 |
| 7,971,843 B2 * | 7/2011 | Becker | B60N 2/01516 248/424 |

(Continued)

FOREIGN PATENT DOCUMENTS

| DE | 19924579 A1 | 12/2000 |
| DE | 10036553 A1 | 9/2001 |

(Continued)

OTHER PUBLICATIONS

International Search Report for PCT/EP2014/001868 dated Oct. 22, 2014.

*Primary Examiner* — D Glenn Dayoan
*Assistant Examiner* — Paul Chenevert
(74) *Attorney, Agent, or Firm* — Bachman & LaPointe, PC

(57) ABSTRACT

A device for immobilizing an object, in particular a seat in a vehicle, on a rail (1) by at least one securing element (4.1, 4.2). The securing element (4.1, 4.2) is arranged on a reinforcement (2) which is inserted into the rail (1).

7 Claims, 3 Drawing Sheets

(56) References Cited

U.S. PATENT DOCUMENTS

| | | | | |
|---|---|---|---|---|
| 2010/0270822 | A1* | 10/2010 | Fujitsuka | ............... B60N 2/073 |
| | | | | 296/65.13 |
| 2013/0206953 | A1 | 8/2013 | Eckenroth et al. | |
| 2015/0306980 | A1* | 10/2015 | Furuta | .................... B60N 2/072 |
| | | | | 248/429 |

FOREIGN PATENT DOCUMENTS

| | | | | |
|---|---|---|---|---|
| DE | 10201622 | A1 | 9/2002 | |
| DE | 10144065 | A1 | 4/2003 | |
| DE | 10315842 | A1 | 10/2004 | |
| DE | 102010063615 | A1 | 2/2012 | |
| EP | 0500412 | A1 | 8/1992 | |
| EP | 0615879 | A1 * | 9/1994 | ............... B60N 2/01 |
| FR | 2771348 | A1 * | 5/1999 | ......... B60N 2/01583 |
| FR | 2784628 | A1 * | 4/2000 | ......... B60N 2/01583 |
| JP | 3731959 | B2 * | 1/2006 | ......... B60N 2/01583 |

\* cited by examiner

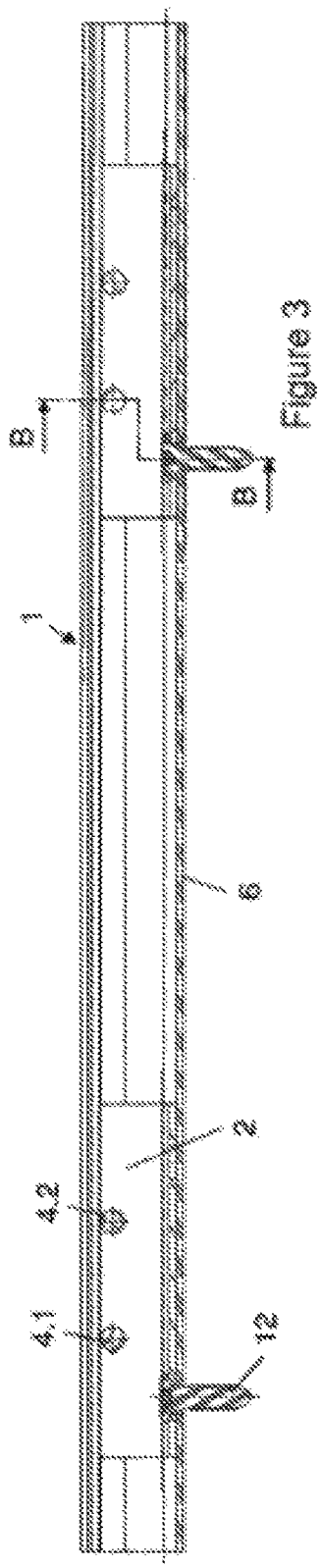
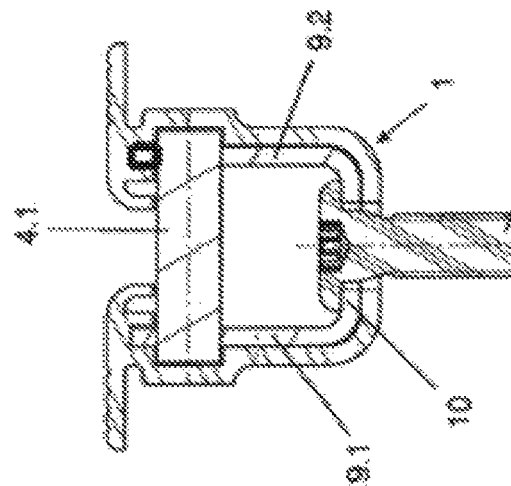
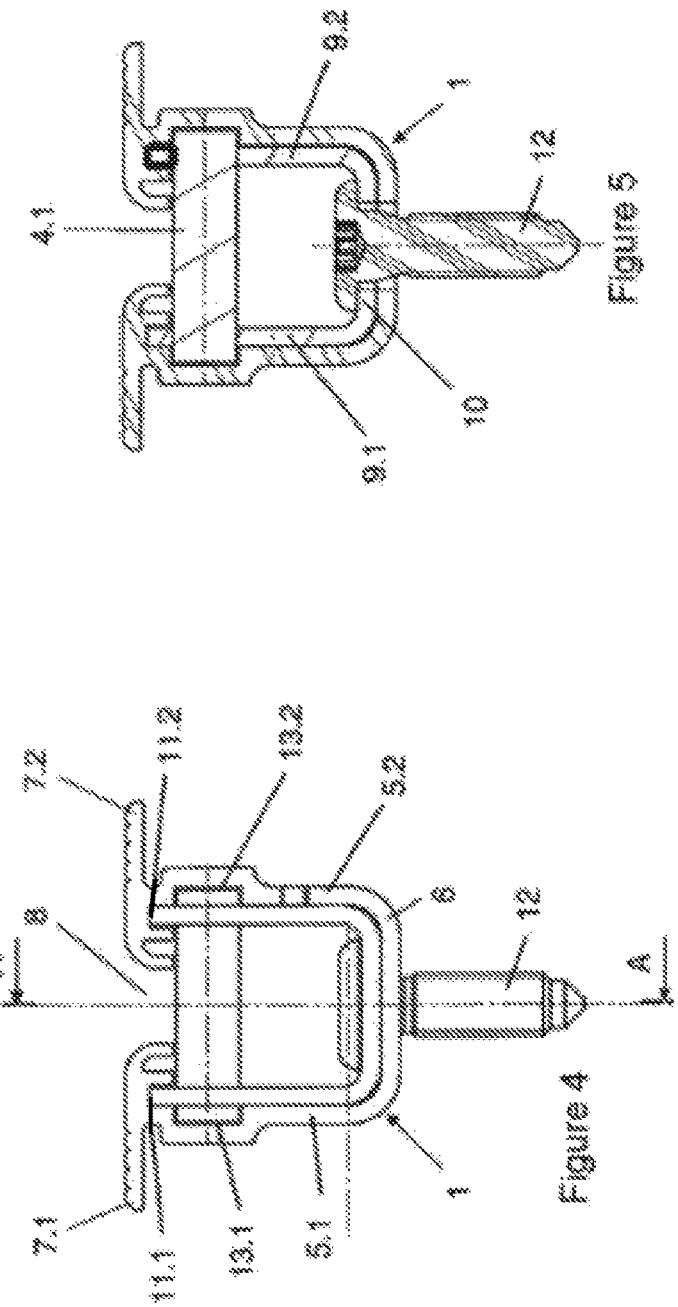

VEHICLE SEAT SLIDE RAIL REINFORCEMENT

This application claims foreign priority to German application 10 2013 107 083.3, filed Jul. 5, 2013.

BACKGROUND OF THE INVENTION

The invention relates to a device for securing an object, in particular a seat in a vehicle, on a rail by means of at least one fastening element which is disposed on a reinforcement which is inserted into the rail.

In many instances of daily life a device for securing the object on an arbitrary rail is required. The present invention relates above all to securing seats in a vehicle, and herein in particular to fastening seats of the second and subsequent rows in vans and minibuses. There are two approaches to this:

Displaceable Seat Position:

The passenger is able to longitudinally adjust the seat/the seat row in a stepless or stepped manner in the vehicle using a handle. A respective device is shown in DE 102 01 622 A. The rail here is fixedly connected to the vehicle floor. Said rail for guiding a slider has an undercut region which extends in the longitudinal direction, as well as a plurality of cutouts on a longitudinal groove, which are disposed at regular spacing. The slider here contains an elongate pair of strip elements which are fixedly interconnected and which for being guided in a sliding manner in the undercut region of the rail have a sliding element of plastics.

Fixed Seat Position:

The seats/seat rows are fixedly screwed to rails or by way of stud bolts; displacement if at all can only be implemented in a complex manner.

The constructions which are known in each case are very complex since they have to meet higher crash requirements.

A longitudinal adjustment device for a vehicle seat, having an upper rail and a lower rail which are mutually separable, is known from DE 10 2010 063 615 A1. Here, a rail profile on which a locking element of an upper rail may be secured sits in a lower rail.

A device of the type mentioned above is known from DE 100 36 553 A1. Here, an insert element for securing seats is displaceably disposed in a rail.

It is an object of the present invention to develop a very simple and cost-effective variant for the objects in order for them to be secured.

SUMMARY OF THE INVENTION

The achievement of the object lies in that at least one free leg of the reinforcement is guided in a groove in the rail.

This reinforcement according to the invention undertakes securing and mounting of the entire object, in particular of the seat, such that an aluminum profile having a very thin wall may be selected for the actual rail. This thin-walled aluminum profile is reinforced by the reinforcement which is preferably composed of a sheet steel panel. The respective fastening elements, for example the seat receiving bolts, then transmit the forces in particular in the case of a crash via the sheet steel panel and the aluminum profile to a fastening screw by way of which the reinforcement is secured in the vehicle floor or in the rail, respectively.

As mentioned above, the reinforcement in one preferred exemplary embodiment is composed of a sheet steel panel which is bent in a corresponding manner. Here, a U-shaped profile presents itself as the cross-sectional shape, such that the reinforcement is composed of two legs which are interconnected by a base.

Of course, it is conceivable for the reinforcement to be secured in the rail at only one point. However, this kind of securing should preferably be designed so as to be releasable, that is to say that the reinforcement is displaceable in the rail. To this end, it serves as mentioned above that the reinforcement by way of at least one free leg is guided in a groove of the rail, such that lateral deflection of the reinforcement is impossible.

The reinforcement in turn serves as a mounting for respective fastening elements, in particular for seat receiving bolts. In order for the latter to be likewise secured in the rail, the rail has longitudinal grooves molded into the side flanges thereof.

BRIEF DESCRIPTION OF THE DRAWINGS

Further advantages, features, and details of the invention are to be derived from the following description of preferred exemplary embodiments and by means of the drawings in which:

FIG. 3 shows a longitudinal section through the device according to FIGS. 1 and 2, along the line A-A in FIG. 4;

FIG. 4 shows a side view of the device according to the invention for securing an object;

FIG. 5 shows a cross section through the device according to the invention for securing an object, along the line B-B in FIG. 3.

DETAILED DESCRIPTION

Figure 1:
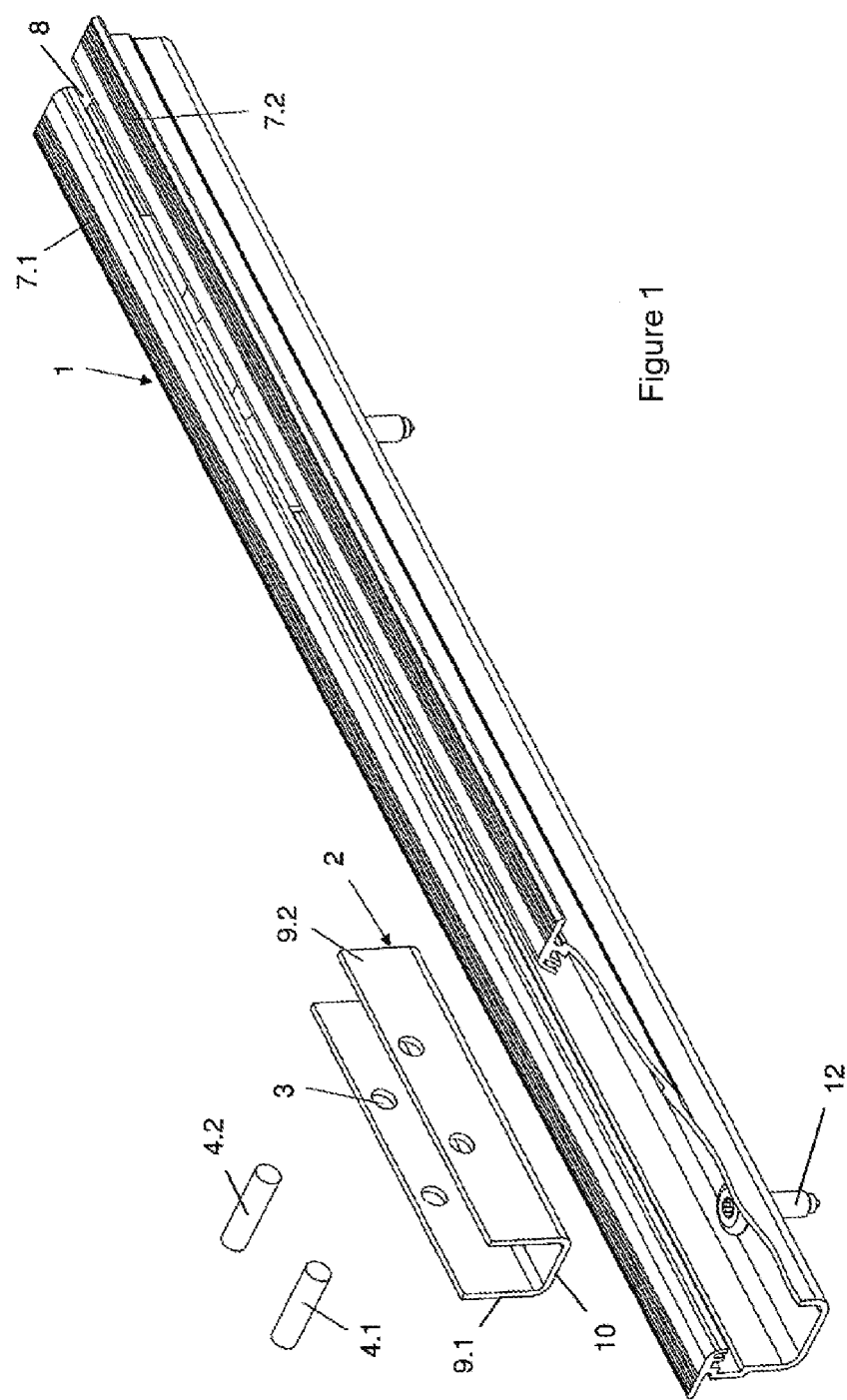
FIG. 1 shows a partially cut away and perspective exploded illustration of a device according to the invention for securing an object.

A device according to the invention for securing an object according to FIG. 1 has a rail 1 into which a reinforcement 2 may be inserted. The reinforcement 2 has receiving holes 3 for receiving bolt-shaped fastening elements 4.1 and 4.2.

The rail 1, in particular according to FIGS. 4 and 5, is of U-shaped design, wherein two side flanges 5.1 and 5.2 are interconnected by a base 6. A tread strip 7.1 and 7.2 protrudes from each side flange 5.1 and 5.2. A slot 8 is exposed between the tread strips 7.1 and 7.2.

The reinforcement 2 also has a U-shaped profile, wherein two legs 9.1 and 9.2 are interconnected by a base 10. The holes 3 are molded into the legs 9.1 and 9.2 so as be mutually opposite.

Figure 2:
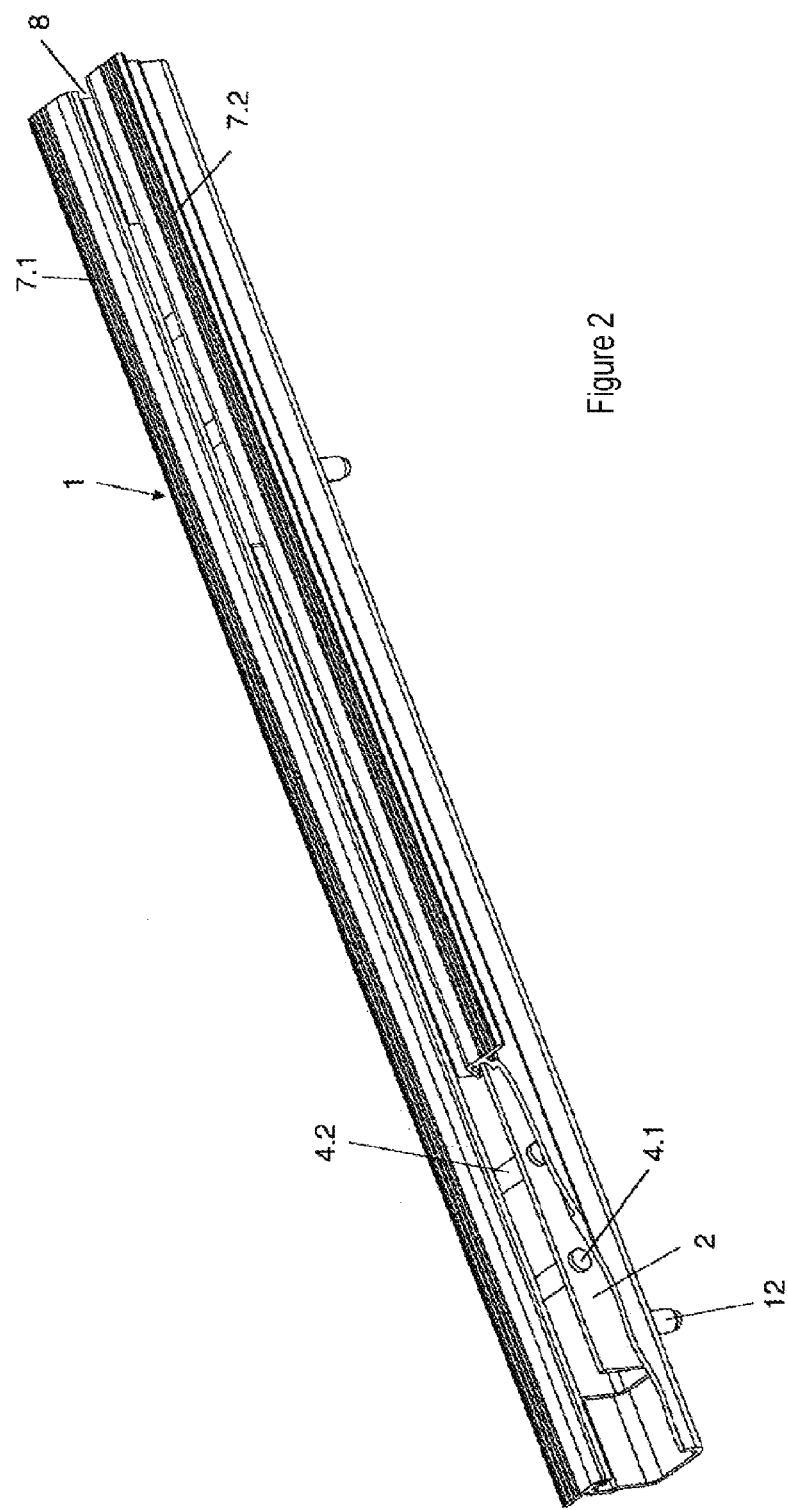
FIG. 2 shows a perspective view of the device according to FIG. 1 in the assembled state and illustrated so as to be partially cut away.

In the use state shown in FIGS. 2 and 3, the reinforcement 2 is inserted into the rail 1. Here, the two legs 9.1 and 9.2 engage in each case in one longitudinal groove 11.1 and 11.2, wherein the longitudinal grooves 11.1 and 11.2 are molded into the lower side of the tread strips 7.1 and 7.2.

Securing the reinforcement 2 in the rail 1 is performed by way of a screw-shaped fastening element 12 which penetrates both the base 10 of the reinforcement 2 as well as the base 6 of the rail 1. According to the invention, a plurality of holes may be provided along the base 6 of the rail 1, such that the reinforcement may be secured at a desired point along the rail 1.

In order for the bolt-shaped fastening elements 4.1 and 4.2 to be also securely mounted in the rail 1, longitudinal grooves 13.1 and 13.2 in which projecting parts of the bolt-shaped fastening elements 4.1 or 4.2, respectively, may engage are in each case molded into the side flanges 5.1 and 5.2 of the rail 1.

The invention claimed is:

1. A device for securing an object, in particular a seat in a vehicle, comprising
   a rail (1) having a base (6), two vertical side flanges (5.1, 5.2) extending upwardly from the base (6), and horizontal side flanges (7.1, 7.2) extending laterally from the vertical side flanges (5.1, 5.2), the vertical side flanges (5.1, 5.2) defining downwardly opening grooves (11.1, 11.2), and
   at least one fastening element (4.1, 4.2) disposed on a reinforcement (2) which is inserted into the rail (1), wherein the reinforcement (2) has a base (10) and two free legs (9.1, 9.2) extending upwardly into and guided by the downwardly opening grooves (11.1, 11.2), wherein the free legs (9.1, 9.2) extend straight upwardly into the downwardly opening grooves, and the base (10) of the reinforcement is adjacent to the base (6) of the rail, and wherein the reinforcement (2) is fixed in the rail (1) against longitudinal movement along the rail (1).

2. The device as claimed in claim 1, wherein the reinforcement (2) is composed of a bent sheet steel panel.

3. The device as claimed in claim 1, wherein the reinforcement (2) has a U-shaped profile.

4. The device as claimed in claim 1, wherein the rail (1) in the cross section is a U-shaped design.

5. The device as claimed in claim 1, wherein a fastening (12) is inserted into the rail (1) through a clearance of the reinforcement (2).

6. The device as claimed in claim 1, wherein the at least one receiving bolt (4.1, 4.2) is assigned to the reinforcement (2) as a fastening element for the object.

7. The device as claimed in claim 6, wherein the rail (1) has incorporated longitudinal grooves (13.1, 13.2) for partially receiving the at least one receiving bolt.

* * * * *